(12) United States Patent
Sun et al.

(10) Patent No.: US 6,417,961 B1
(45) Date of Patent: Jul. 9, 2002

(54) OPTICAL AMPLIFIERS WITH DISPERSION COMPENSATION

(75) Inventors: Yan Sun, Menlo Park; Chien-Jen Chen, Cupertino; William S. Wong, San Jose, all of CA (US)

(73) Assignee: Onetta, Inc., Sunnyvale, CA (US)

( * ) Notice: Subject to any disclaimer, the term of this patent is extended or adjusted under 35 U.S.C. 154(b) by 25 days.

(21) Appl. No.: 09/727,775

(22) Filed: Dec. 4, 2000

Related U.S. Application Data
(60) Provisional application No. 60/238,422, filed on Oct. 10, 2000.

(51) Int. Cl.$^7$ .................................................. H01S 3/00
(52) U.S. Cl. ..................................... 359/337.5; 359/334
(58) Field of Search ........................... 359/337.5, 334

(56) References Cited

U.S. PATENT DOCUMENTS

| | | | |
|---|---|---|---|
| 5,260,816 A | 11/1993 | Edagawa et al. | 359/341 |
| 5,453,873 A | 9/1995 | Millar et al. | 359/341 |
| 5,513,029 A | 4/1996 | Roberts | 359/177 |
| 5,838,487 A | 11/1998 | Nilsson et al. | 359/341 |
| 5,859,938 A | 1/1999 | Nabeyama et al. | 385/24 |
| 5,861,973 A | 1/1999 | Inagaki et al. | 359/341 |
| 5,887,093 A * | 3/1999 | Hansen et al. | 385/27 |
| 5,900,969 A | 5/1999 | Srivastava et al. | 359/341 |
| 6,049,413 A | 4/2000 | Taylor et al. | 359/337 |
| 6,061,171 A | 5/2000 | Taylor et al. | 359/341 |
| 6,094,298 A | 7/2000 | Luo et al. | 359/346 |
| 6,134,047 A | 10/2000 | Flood et al. | 359/341 |
| 6,178,038 B1 * | 1/2001 | Taylor et al. | 359/341 |
| 6,198,572 B1 | 3/2001 | Sugaya et al. | 359/337 |
| 6,215,581 B1 | 4/2001 | Yadlowsky | 359/337 |
| 6,222,962 B1 | 4/2001 | Nilsson | 385/37 |
| 6,236,500 B1 * | 5/2001 | Suzuki et al. | 359/341 |

FOREIGN PATENT DOCUMENTS

| | | |
|---|---|---|
| EP | 0 734 105 A2 | 9/1996 |
| WO | WO 99/53620 | 10/1999 |
| WO | WO 00/14909 | 3/2000 |

OTHER PUBLICATIONS

Delavaux et al. "Optimized Two–Stage In–Line Balanced Optical Amplifier Design" Academic Press, p. 239–243 (1995).

(List continued on next page.)

*Primary Examiner*—Mark Hellner
(74) *Attorney, Agent, or Firm*—Fish & Neave; G. Victor Treyz

(57) ABSTRACT

Optical amplifiers are provided that have dispersion-compensating fiber that is pumped with an optical source to produce Raman gain. Removable modules of dispersion-compensating fiber, which may be separate from the Raman-pumped dispersion-compensating fiber, may be used to adjust the amount of dispersion compensation provided by a given amplifier. The Raman pump may be formed using fiber-Bragg-grating-stabilized diode lasers or other suitable pump sources. Two cross-polarized diode lasers may be used for the Raman pump to reduce the dependence of the Raman gain on the polarization of the pump. If desired, the dispersion-compensating fiber may be Raman pumped using a two-pass configuration in which pump light reflects off of a reflector to produce additional gain. The reflector may be a Faraday rotator to minimize polarization-dependent pump effects.

6 Claims, 5 Drawing Sheets

OTHER PUBLICATIONS

Sun et al. "Optical Fiber Amplifiers for WDM Optical Networks" Bell Labs Journal, p. 187–206, Jan.–Mar., 1999.

Sun et al. "Ultra Wide Band Erbium–Doped Fiber Amplifier with 80nm of Bandwidth" OSA Trends in Optics and Photonics, vol. 16 1997.

Ono et al. "Automatic Gain Control in Silica–Based EDFA with over 50nm Flat Gain Bandwidth using an all Optical Feedback Loop" 10$^{th}$ Optical Amplifiers and their Applications Technical Digest, Jun. 9–11, 1999.

Kakui et al. "Dynamic–Gain–Tilt–Free Long–Wavelength Band Erbium Doped Fiber Amplifiers Utilizing Temperature Dependent Characteristics of Gain Spectrum" 25$^{th}$ Optical Fiber Communication Conference, Technical Digest, p. 6–8, (Mar. 8, 2000).

Masuda "Review of Wideband Hybrid Amplifiers" 25$^{th}$ Optical Fiber Communication Conference, Technical Digest, p. 2–4, (Mar. 7, 2000).

Lewis et al. "Low–Noise High Gain Dispersion Compensating Broadband Raman Amplifier" 25$^{th}$ Optical Fiber Communication Conference, Technical Digest, p. 5–7, (Mar. 7, 2000).

Sun et al. "Average Inversion Level, Modeling and Physics of Erbium–Doped Fiber Amplifiers" IEEE Journal of Selected Topics in Quantum Electronics, vol. 3, No. 4, Aug. 1997.

* cited by examiner

OPTICAL AMPLIFIERS WITH DISPERSION COMPENSATION

This application claims the benefit of provisional patent application No. 60/238,422, filed Oct. 10, 2000.

BACKGROUND OF THE INVENTION

The present invention relates to fiber-optic communication networks, and more particularly, to optical amplifiers with dispersion compensation for use in optical communications networks.

In optical networks that use wavelength division multiplexing, multiple wavelengths of light are used to support multiple communications channels on a single fiber. Optical amplifiers are used in such networks to amplify and reshape optical signals that have been subject to attenuation and dispersion over multi-kilometer fiber-optic links. A typical amplifier may include erbium-doped fiber amplifier components that are pumped with diode lasers and a mid-stage dispersion compensation module. The erbium-doped fiber amplifier stages increase the strength of the optical signals being transmitted over the fiber-optic links. The mid-stage dispersion compensation module is used to compensate for the effects of chromatic dispersion in the transmission fiber.

There are many fiber spans in a typical network link. For example, a long-haul network link may be approximately 400–600 km in length and an ultra-long-haul network link may be 3000–5000 km in length. Each fiber span is typically 40–120 km in length, so there may be many amplifiers in such links. The spans of transmission fiber generally do not all have the same length. In certain areas of the network it may be necessary to use long fiber spans to surmount geographic obstacles. Shorter links may be used in other areas.

Amplifiers that have removable mid-stage dispersion compensation modules are used to accommodate fiber spans of different lengths. For example, when spans of fiber in the network are 100 km in length, the mid-stage dispersion compensation modules in the amplifiers that are used for such spans are selected to compensate for 100 km of fiber dispersion. Although useful for compensating for the effects chromatic dispersion, the dispersion-compensating fiber in mid-stage dispersion compensation modules introduces attenuation and contributes to the noise figure of the amplifier.

It is an object of the present invention to provide optical amplifier arrangements that compensate for dispersion without introducing excessive noise figure penalties.

SUMMARY OF THE INVENTION

This and other objects of the invention are accomplished in accordance with the present invention by providing optical amplifiers having dispersion-compensating fiber that is pumped with an optical source to produce Raman gain. By producing Raman gain in the otherwise lossy dispersion compensation section of the amplifier, the noise figure of the amplifier may be reduced.

Removable modules of dispersion-compensating fiber, which may be separate from the Raman-pumped dispersion-compensating fiber, may be used to adjust the amount of dispersion compensation provided by a given amplifier. This allows field technicians to adjust the amount of dispersion compensation that is produced by a given amplifier to match the dispersion compensation requirements of a particular fiber transmission span.

The Raman pump may be formed using fiber-Bragg-grating-stabilized diode lasers or other suitable pump sources. Two cross-polarized diode lasers may be used for the Raman pump to reduce the dependence of the Raman gain on the polarization of the pump. If desired, the dispersion-compensating fiber may be Raman pumped using a two-pass configuration in which pump light passes through a Faraday rotator to minimize polarization-dependent pump effects and to produce additional gain.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
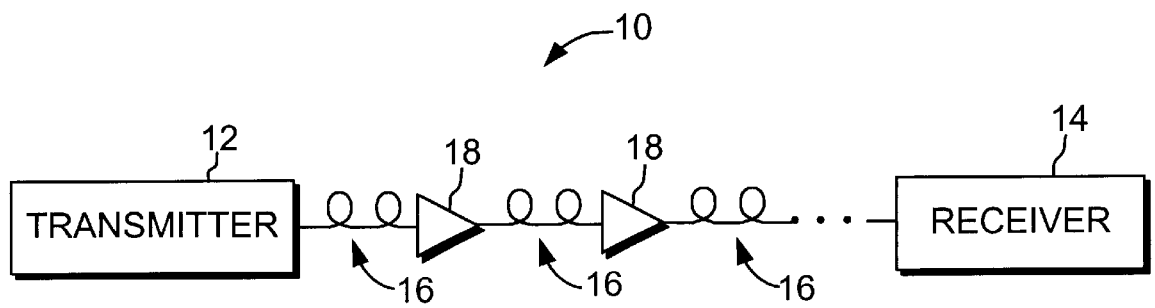
FIG. 1 is a schematic diagram of an illustrative optical communications link using optical amplifiers in accordance with the present invention.

An illustrative optical communications link 10 in accordance with the present invention is shown in FIG. 1. A transmitter 12 may transmit information to a receiver 14 over a series of fiber links. Each fiber link may include a span 16 of optical transmission fiber. Fiber spans may be on the order of 40–120 km in length for long-haul networks or may be any other suitable length for use in signal transmission in an optical communications network. In general, fiber spans 16 are not all the same length.

As optical signals travel along the optical fibers 16, signal strength is attenuated and signals are subject to chromatic dispersion. Optical amplifiers 18 may therefore be used to amplify the optical signals between successive spans of fiber and to compensate for dispersion.

The communications link of FIG. 1 may be used to support wavelength-division-multiplexing arrangements in which multiple communications channels are provided using multiple wavelengths of light. For example, the link of FIG. 1 may support a system with 40 channels, each using a different optical carrier wavelength. The channels may support data rates of, for example, approximately 10 Gbps (OC-192). The carrier wavelengths that are used may be in the vicinity of 1530–1560 nm. These are merely illustrative system characteristics. If desired, more channels may be provided (e.g., hundreds of channels), the channels may carry data at higher data rates (e.g., approximately 40 Gbps for OC-768), or a wider range of carrier wavelengths may be supported (e.g., 1480–1610 nm).

Conventional optical amplifiers may have a preamplifier stage, a power amplifier stage, and a removable unpumped mid-stage dispersion compensation module that includes a length of dispersion-compensating fiber. Such conventional modules are used to provide various different amounts of dispersion compensation. For example, one module 26 may have a 10 km length of fiber that is suitable for compensating for the effects of approximately 50 km of transmission fiber, whereas another module 26 may have a 15 km length of fiber that is suitable for compensating for the effects of approximately 75 km of fiber.

Figure 2:
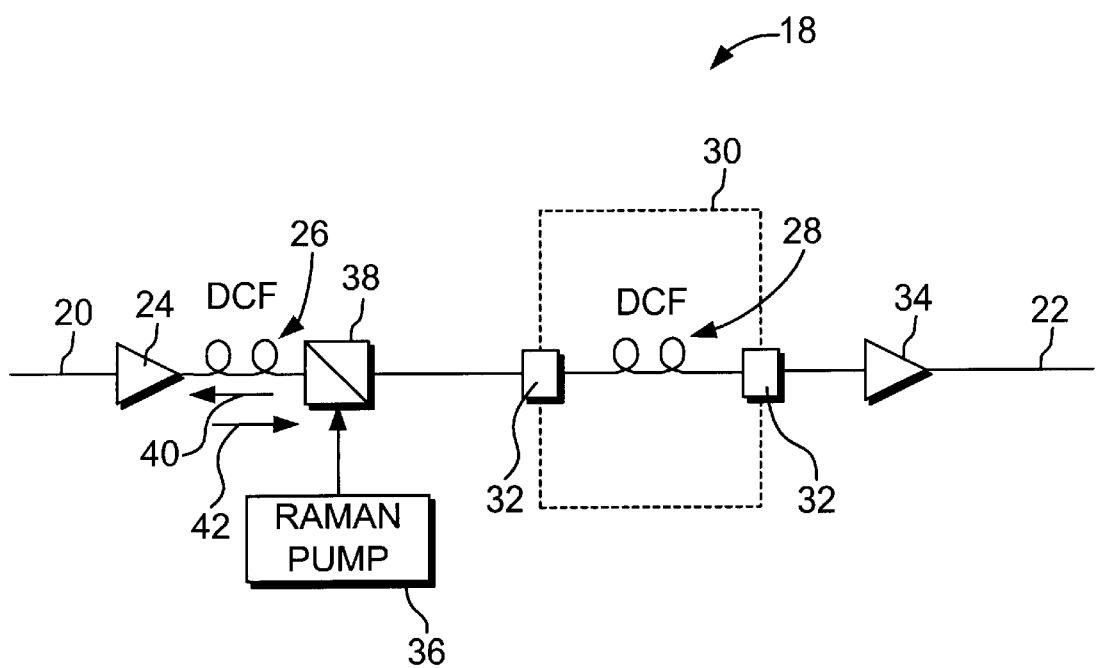
FIG. 2 is a schematic diagram of an illustrative optical amplifier with Raman-pumped dispersion-compensating fiber and a removable dispersion compensation module in accordance with the present invention.

An illustrative optical amplifier 18 in accordance with the present invention is shown in FIG. 2. Optical signals that are provided to input fiber 20 are provided as amplified and dispersion-compensated output signals at output fiber 22. Amplifier 18 of FIG. 2 may have a low-noise preamplifier such as such as first amplifier stage 24. A coil 26 of dispersion-compensating fiber may be placed in the optical path after amplifier stage 24 to compensate for chromatic dispersion. As an example, a fixed length of 7 km of dispersion-compensating fiber may be used. This length is suitable to compensate for the effects of approximately 40 km of transmission fiber.

Another coil 28 of dispersion-compensating fiber may be placed in the optical path after coil 26. Coil 28 may be provided as a removable mid-stage dispersion-compensation module 30. Module 30 may be connected to the main fiber path using connectors 32. Connectors 32 may be, for example, low-backwards-reflection connectors such as FC/APC connectors or any other suitable connectors. The amount of dispersion compensation provided by amplifier 18 may be adjusted by using a module 30 with a coil 28 that has the appropriate amount of dispersion-compensating fiber. For example, if a small amount of dispersion compensation is desired (e.g., to compensate for the dispersion in a short length of transmission fiber), a coil 28 that has a small amount of dispersion-compensating fiber may be installed in amplifier 18. If a large amount of dispersion compensation is desired (e.g., to compensate for the dispersion in a long length of transmission fiber), a coil 28 that has a large amount of dispersion-compensating fiber may be installed in amplifier 18.

The output of coil 28 may be provided to a second amplifier stage 34. Amplifier stage 34 may be a power amplifier. The portion of amplifier 18 between stages 24 arid 34 may be referred to as the mid-stage of amplifier 18.

Amplifiers 36 and 40 may be based on any suitable devices for producing optical gain such as semiconductor amplifiers or fiber amplifiers. As an example, amplifier stages 36 and 40 may be rare-earth-doped fiber amplifiers pumped by diode lasers.

Amplifier stage 36 may, for example, include one or more lengths of erbium-doped fiber pumped by a 980 nm diode laser pump. Amplifier stage 40 may include one or more lengths of erbium-doped fiber pumped by a 1480 nm laser diode source. The erbium-doped fiber coils in stages 36 and 40 may be several to many meters in length. The pumps used to pump stages 36 and 40 may be formed from one or more individual laser diodes.

Coil 26 may be pumped to produce Raman gain using Raman pump 36. Light from Raman pump 36 may be launched into coil 26 in direction 40 using pump coupler 38.

Coil 26 may or may not be provided with connectors such as FC/APC connectors. An advantage of the arrangement of FIG. 2 in which coil 26 does not have connectors is that high-power pump light from Raman pump 36 does not pass directly into a connector. If high-power pump light were provided directly to a connector, the connector might exhibit an increased susceptibility to dirt or other imperfections.

Figure 3:
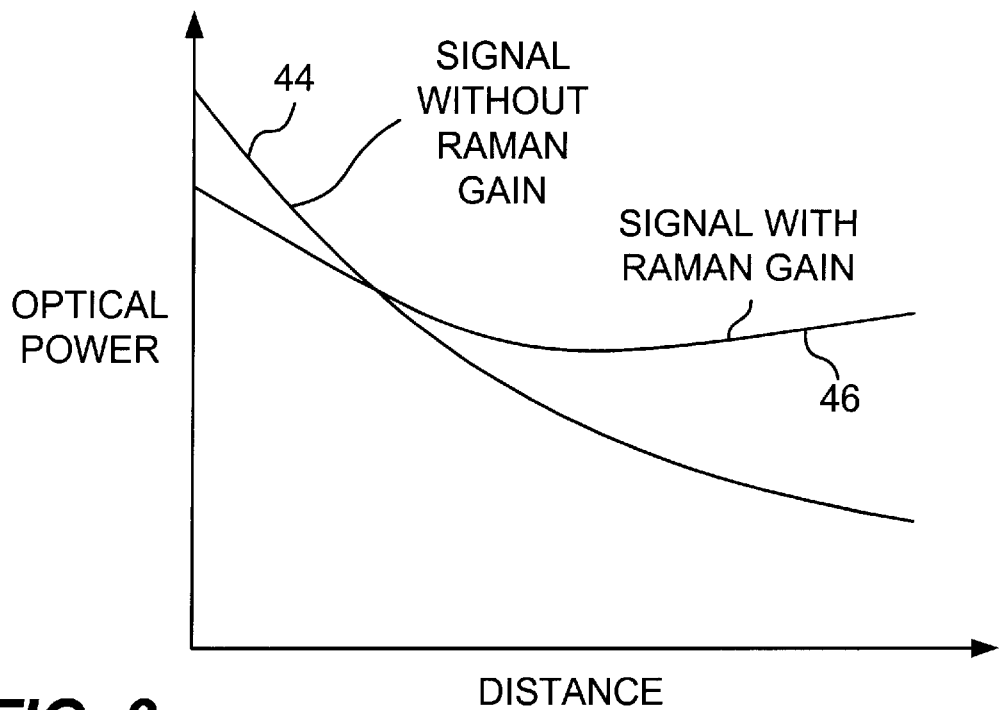
FIG. 3 is a graph showing the effects of using Raman pumping in an illustrative dispersion-compensation arrangement of the type shown in FIG. 2 in accordance with the present invention.

The effect of using a Raman pump (e.g., a Raman pump operating at 1455 nm) in mid-stage dispersion compensation module 30 for an illustrative optical signal at 1550 nm is shown in the graph of FIG. 3. In the graph, optical signal strength is plotted as a function of distance through the dispersion-compensating fiber 26 in direction 42 (FIG. 3). As shown in FIG. 3, an optical signal without Raman pumping (curve 44) would be attenuated due to the attenuation in dispersion-compensating fiber 26.

When coil 26 is Raman pumped, optical signals are subject to both fiber attenuation effects and Raman gain. If the Raman pump power propagates in the backwards direction 40 (as with the arrangement of FIG. 2), Raman gain will be highest near the signal output of fiber 26. Nearer the output region of fiber 26, the gain provided by the Raman pump is greater than the fiber attenuation and the optical signal strength increases, as shown by curve. 46. Depending on the length of fiber 26 and the strength of the Raman pump, fiber coil 26 may produce a net gain or a net loss in the optical signal strength. The attenuation through fiber 26 with Raman pumping is, however, always less than the attenuation through fiber 26 without Raman pumping. The use of Raman pumping in coil 26 therefore reduces midstage optical signal losses, thereby improving the noise figure of amplifier 18.

The total optical signal power in fiber 26 (as represented by the area under curve 44 in FIG. 3) is preferably maintained low enough to avoid nonlinear optical effects such as the Kerr effect. Such nonlinear effects may be exacerbated by the relatively smaller core size that may be used in dispersion compensating fiber 26 relative to the transmission fiber in spans 16. For this reason, it may be particularly desirable to locate dispersion-compensating fiber 26 between preamplifier stage 24 and power amplifier stage 34, as shown in FIG. 2.

Different fiber spans 16 (FIG. 1) may have different lengths and may therefore require different amounts of dispersion compensation. Because the length of coil 26 is fixed, coil 26 contributes a fixed amount of dispersion compensation. Coil 26 may, for example, be of the appropriate length (e.g., about 7 km) to compensate for 40 km of transmission fiber. This is merely an illustrative configuration. If desired, a coil 26 may be used that compensates for more or less dispersion.

Coil 28 may be removed from amplifier 18 and replaced with a short length of single mode fiber when no additional dispersion compensation is desired beyond the dispersion compensation provided by coil 26. For example, if a transmission fiber span 16 is 40 km in length and the dispersion compensation provided by coil 26 is sufficient to compensate for 40 km of dispersion, no additional dispersion compensation is required in module 30 and a module 30 containing a short length of fiber may be used. If, however, a transmission fiber span 16 is 60 km in length, a module 30 may be installed in amplifier 18 that contains a coil 28 sufficient to compensate for an additional 20 km of dispersion. When added to the 40 km of dispersion compensation provided by coil 26, amplifier 18 provides sufficient dispersion compensation to compensate for the dispersion of the entire 60 km span.

Figure 4:
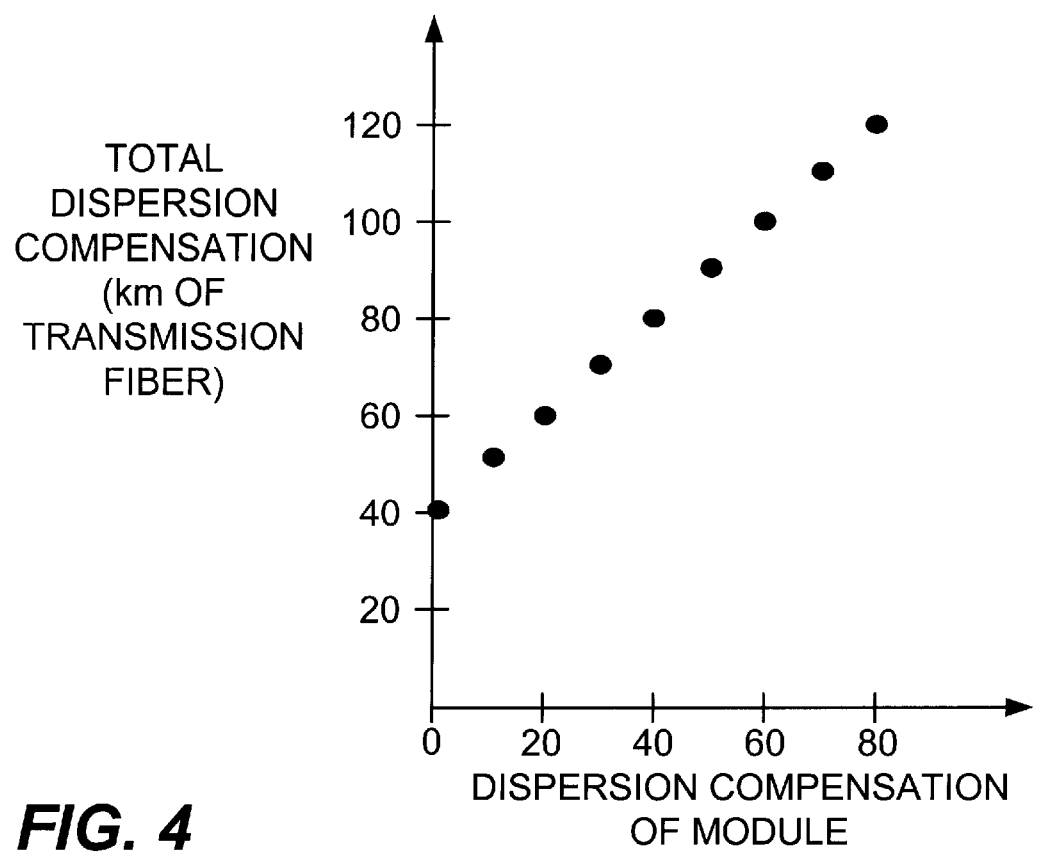
FIG. 4 is a graph showing the various amounts of total dispersion compensation that may be provided using an illustrative optical amplifier arrangement (represented by the various lengths of illustrative transmission fiber for which the amplifier can compensate using various dispersion compensation modules) in accordance with the present invention.

As shown in the example of FIG. 4, the dispersion compensation provided by various illustrative modules 30 may be added linearly to the fixed dispersion compensation provided by coil 26. The total dispersion compensation capabilities of amplifier 18 may therefore cover a range of span lengths (e.g., from 40 km to 120 km in the example of FIG. 4). In the example of FIG. 4, the number of dispersion modules that are provided (represented by the dots in FIG. 4) and the amount of dispersion compensation provided by coil 26 (represented by the y-intercept in FIG. 4) are merely examples. Any suitable amount of dispersion compensation may be provided by coils 26 and the various modules 30 if desired. Moreover, the graph of FIG. 4 shows the lengths of an illustrative single-mode transmission fiber for which the amplifier's different dispersion compensation modules can compensate. These lengths depend on the dispersion characteristics of the transmission fiber and are merely illustrative.

Because a variety of dispersion compensation modules 30 may be manufactured, a field technician may always have an appropriate module at hand to compensate (exactly or approximately) for the amount of dispersion in a particular span 16. The Raman pump in amplifier 18 is used to pump the fixed dispersion-compensating fiber 26. If desired, a Raman pump may also be used to pump the dispersion compensating fiber 28 in module 30, but such a Raman pump is not required. An advantage of not using a Raman pump in each module 30 is that this lowers the cost and complexity of modules 30. Moreover, even though the amount of dispersion compensation provided by amplifier 18 may be adjusted using modules 30, the impact of the Raman pump on the operating characteristics of amplifier 18 is relatively constant in configurations in which only fiber 26 is Raman pumped, because the length of fiber 26 is fixed.

Figure 5:
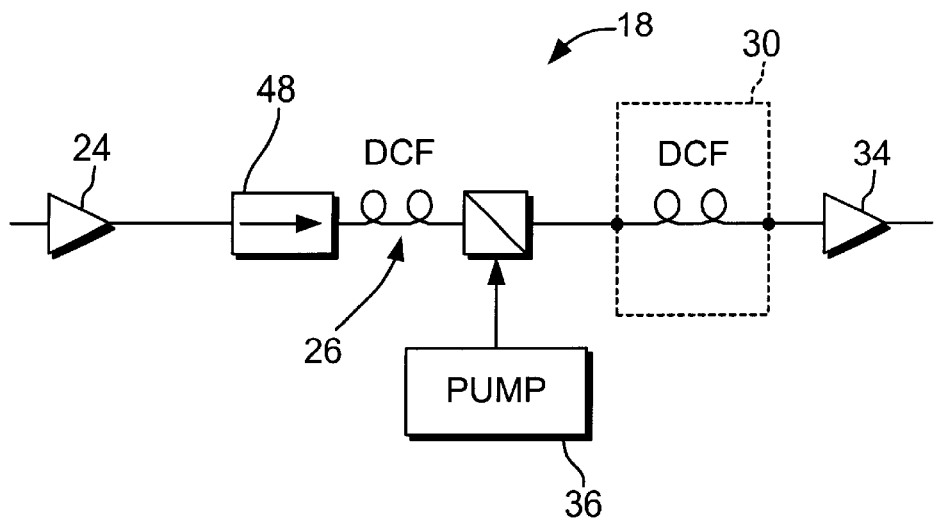
FIG. 5 is a schematic diagram of an illustrative optical amplifier having an isolator to block backwards-directed Raman pump light in accordance with the present invention.

As shown in FIG. 5, an isolator 48 may be used to prevent backwards-propagating pump light from pump 36 from affecting the operation of amplifier stage 24.

Figure 6:
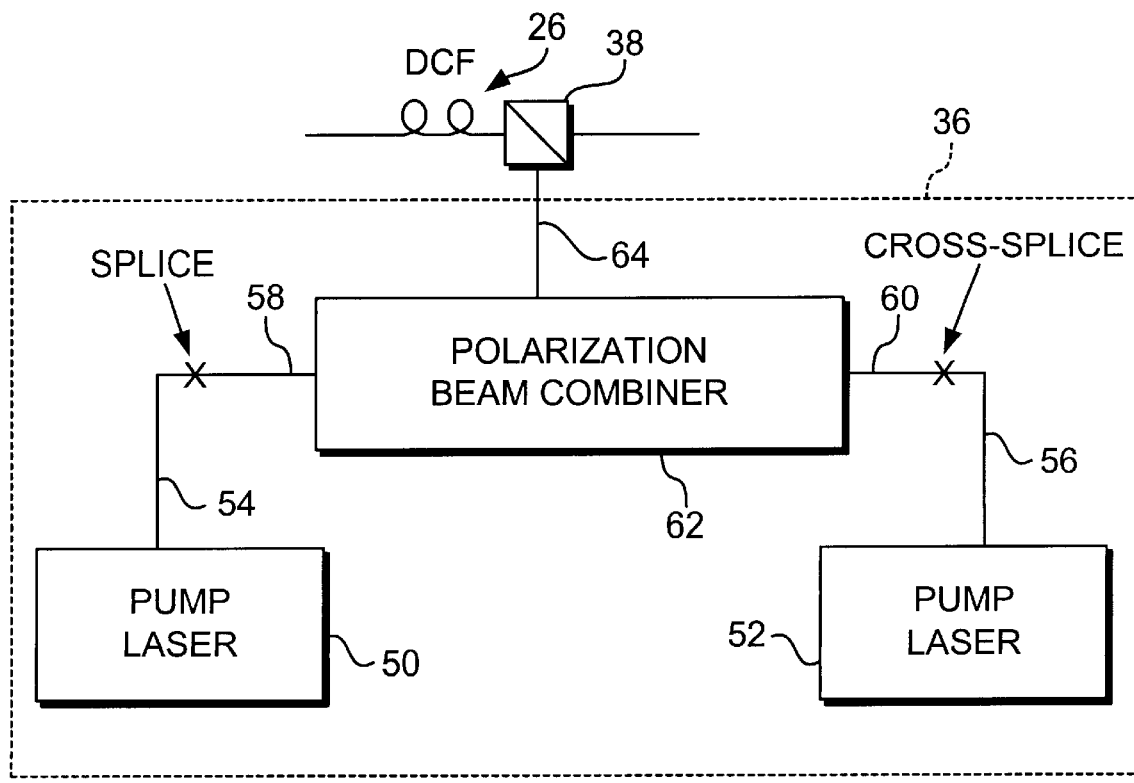
FIG. 6 is a schematic diagram of an illustrative pumping arrangement that may be used to pump dispersion-compensating fiber in accordance with the present invention.

Raman pump 36 may be any suitable source of light such as a diode laser or lasers operating at 1455 nm. An illustrative Raman pump arrangement is shown in FIG. 6. As shown in FIG. 6, Raman pump power may be supplied by two fiber Bragg grating stabilized pump lasers 50 and 52. Lasers 50 and 52 may be, for example, 200 mW InGaAsP diode lasers operating at a wavelength of 1455 nm. Polarization-maintaining fiber 54 and 56 may be pigtailed to lasers 50 and 52. Fiber 54 may be spliced to the pigtailed fiber 58 of a polarization beam combiner 62. Fiber 56 may be cross-spliced to the pigtailed fiber 60 of beam combiner 62. With this configuration, the light from laser 50 that is provided to polarization beam combiner 62 may be primarily p-polarized, whereas the light from laser 52 that is provided to polarization beam combiner 62 may be primarily s-polarized. The outputs of lasers 50 and 52 may therefore be orthogonally polarized with respect to each another, so that the combined output pump signal that is provided at the output 64 of beam combiner 62 is unpolarized. Because output 64 is unpolarized, polarization-dependent Raman gain effects in fiber 26 are minimized.

Pump coupler 38, which may be, for example, a wavelength division multiplexing coupler or a circulator, may be used to couple the 1455 nm pump light from lasers 50 and 52 into dispersion compensating fiber 26 in direction 40 (FIG. 2). As shown in FIG. 2, optical signals from preamplifier 24 travel in direction 42 and benefit from the Raman gain and dispersion compensation provided by fiber 26. The mid-stage dispersion compensation module 30 provides additional dispersion compensation using fiber coil 28. Modules such as module 30 may be compact removable modules that are easily replaced in the field.

With a 1455 nm pump, Raman gain in fiber 26 may be exhibited in the range of approximately 1505–1605 nm. Because the gain from the erbium-doped fiber (or other rare-earth-doped fiber) in stages 24 and 34 overlaps with the Raman gain in fiber 26 for wavelengths in the vicinity of 1550 nm, amplifier 18 may be used to handle optical signals in this wavelength region.

If desired, a cladding-pumped fiber Bragg grating Raman laser or any other suitable laser source may be used as the pump for dispersion compensating fiber 26.

Figure 7:
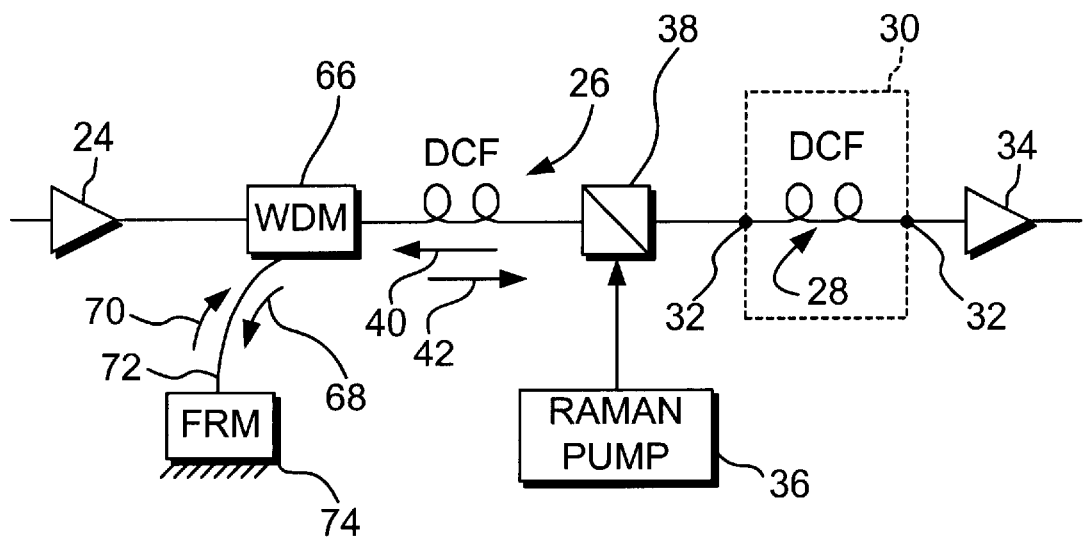
FIG. 7 is a schematic diagram of an illustrative optical amplifier having dispersion-compensating fiber that is pumped using a two-pass pump arrangement and having a replaceable dispersion compensation module in accordance with the present invention.

Amplifier 18 may use a two-pass pump arrangement in which Raman pump light passes through dispersion-compensating fiber 26 in both the forwards and backwards directions. As shown in FIG. 7, pump light from pump 36 may be launched into fiber 26 in direction 40. Wavelength division multiplexer (WDM) coupler 66 directs the pump light propagating in direction 40 into fiber 72 while allowing output signals on the data channels from stage 24 to pass in direction 42. The pump light from coupler 66 propagates through fiber 72 in direction 68.

A 45° Faraday rotator with an integral mirror 74 (i.e., a Faraday rotator mirror (FRM)) may be provided at the end of fiber 72. When pump light propagating in direction 68 reaches Faraday mirror 74, the pump light is reflected in direction 70 and the polarization of the pump light is subject to rotation. The cumulative rotational effect on the polarization of the pump light is 90°, because the pump light makes two passes through the 45° Faraday rotator portion of Faraday mirror 74.

After returning to coupler 66 through fiber 72 in direction 70, the pump light again passes through dispersion-compensating fiber 26. Because the polarization of the light propagating through fiber 26 in direction 42 is rotated 90° with respect to the light propagating through fiber 26 in direction 40, polarization-dependent Raman gain effects in fiber 26 are minimized. Moreover, the arrangement of FIG. 7 allows the pump light that is remaining after the first pass through fiber 26 to be effectively reused during the second pass, which increases the overall pump efficiency.

Figure 8:
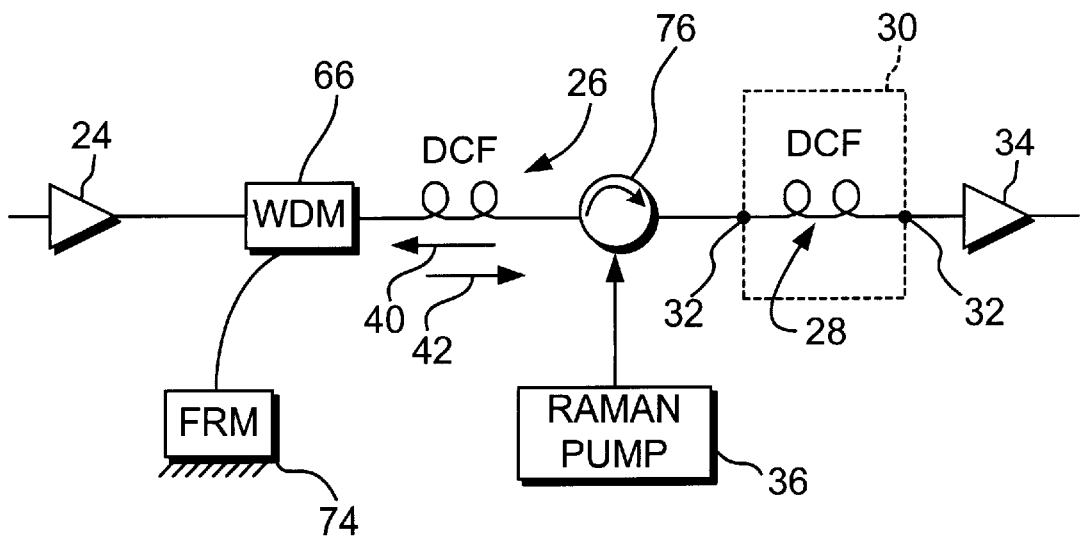
FIG. 8 is a schematic diagram of an illustrative optical amplifier that has dispersion-compensating fiber that is pumped using a two-pass pump arrangement having a circulator and a Faraday rotator mirror and that has a replaceable dispersion compensation module in accordance with the present invention.

As shown in FIG. 8, the functions of pump coupler 38 of FIG. 7 may be provided by a circulator 76. With the arrangement of FIG. 8, pump light from pump 36 is launched through fiber 26 in direction 40 by circulator 76. On the return pass through fiber 26 in direction 42, pump light and amplified optical data signals from stage 24 are passed through circulator 76 to the fiber in module 30.

Figure 9:
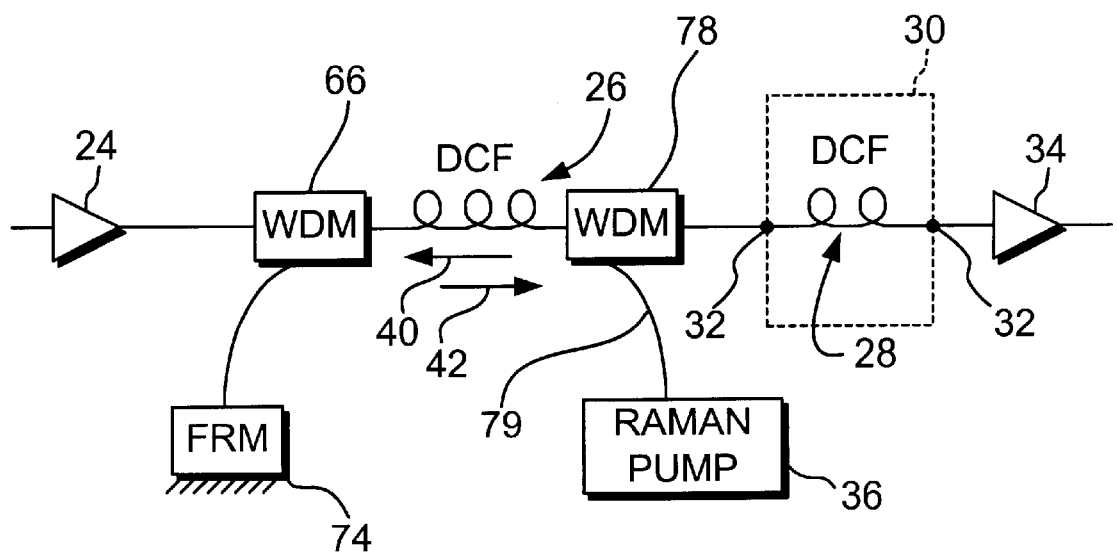
FIG. 9 is a schematic diagram of an illustrative optical amplifier that has dispersion-compensating fiber that is pumped using a two-pass pump arrangement having a wavelength division multiplexing coupler and a Faraday rotator mirror and that has a replaceable dispersion compensation module in accordance with the present invention.

Another suitable arrangement is shown in FIG. 9. Wavelength division multiplexing coupler 78 is used to couple light from Raman pump 36 into fiber 26 in direction 40. On the return pass through fiber 26 in direction 42, pump light is directed back towards Raman pump 36 along fiber 79. Amplified optical data signals are passed to the fiber in module 30. With the approach of FIG. 9, pump light does not pass into module 30, so the amount of Raman gain produced by amplifier 18 is fixed, whereas the residual pump light that passes into module 30 of FIG. 8 may produce some additional gain that depends on the length of the fiber 28 used in the module.

Figure 10:
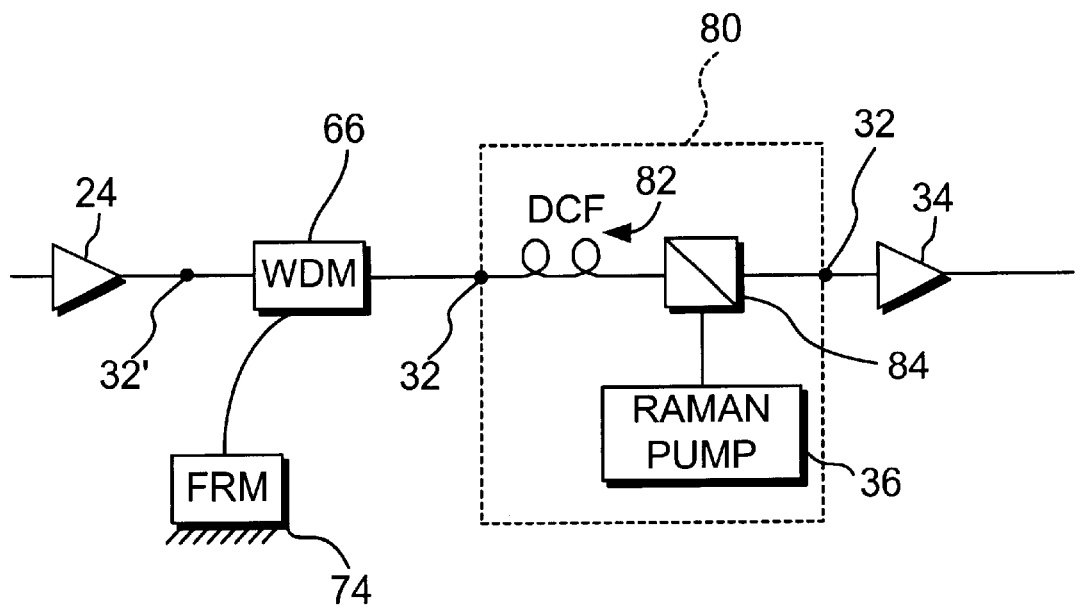
FIG. 10 is a schematic diagram of an illustrative optical amplifier having a replaceable mid-stage dispersion compensation module based on dispersion-compensating fiber that is pumped using a two-pass pump arrangement in accordance with the present invention.

If desired, dispersion compensation may be provided with a single mid-stage two-pass Raman-pumped dispersion compensation module. An arrangement of this type is shown in FIG. 10. The amount of dispersion compensation provided by amplifier 18 of FIG. 10 may be adjusted by installing an appropriate mid-stage dispersion module 80. Raman pump light from Raman pump 36 may be launched into dispersion-compensating fiber 82 using pump coupler 84. After a first pass through fiber 82, pump light is directed to Faraday rotator mirror 74. At mirror 74, the polarization of the pump light is rotated and the pump light is reflected back towards coupler 66. Coupler 66 directs the pump light to the main fiber path, so that the pump light makes another pass through dispersion-compensating fiber 82.

Module 80 of FIG. 10 may be mounted in amplifier 18 using low-backwards-reflection couplers 32 such as FC/APC connectors or any other suitable connectors. This allows a technician to replace module 80 in the field. Different modules 80 may be manufactured with different amounts of dispersion-compensating fiber 82, so that amplifier 18 may be configured to compensate for the different amounts of dispersion that arise from spans of fiber 16 of different lengths.

If desired, a connector 32' may be used instead of using the connector 32 between coupler 66 and fiber 82. With this approach, each module 80 will have a coupler 66 and Faraday mirror 74, which increases the module component count. However, the susceptibility of module 80 to dirt and imperfections at the connector may be reduced, because high-power Raman-pump light does not pass through the connector.

Amplifiers with Raman-pumped mid-stage dispersion compensation fibers may be used in Raman-assisted optical communications systems. In such Raman-assisted optical communications systems, transmission fiber spans such as spans 16 may be Raman-pumped using, for example, backwards-directed Raman pump lasers.

It will be understood that the foregoing is merely illustrative of the principles of this invention, and that various modifications can be made by those skilled in the art without departing from the scope and spirit of the invention. For example, different types of dispersion-compensating elements may be used in amplifiers 18 in place of or in combination with dispersion-compensating fibers. Such dispersion-compensating elements may include integrated waveguide devices, discrete optics, gratings, fiber-gratings, or any other suitable dispersive elements.

What is claimed is:

1. An optical amplifier with dispersion compensation that amplifies optical signals on a plurality of channels at different wavelengths in a fiber-optic communications link, comprising:

an input and an output for the optical signals;

a fiber path that transports the optical signals between the input and output;

first and second optical gain stages that amplify the optical signals as they pass from the input to the output;

a fixed mid-stage coil of dispersion-compensating fiber between the first and second optical gain stages that provides a fixed amount of dispersion compensation;

a removable mid-stage coil of dispersion-compensating fiber in series with the fixed mid-stage dispersion compensating element between the first and second optical gain stages;

a Raman pump that produces Raman gain in the fixed mid-stage coil of dispersion-compensating fiber;

a pump coupler that couples pump light from the Raman pump into the fixed mid-stage coil of dispersion-compensating fiber;

a wavelength division multiplexing coupler that separates pump light from the fiber path after the pump light passes through the fixed mid-stage coil of dispersion-compensating fiber; and a reflector that receives the separated pump light from the wavelength division multiplexing coupler and that reflects the received pump light back through the wavelength division multiplexing coupler and the fixed mid-stage coil of dispersion-compensating fiber.

2. The optical amplifier defined in claim 1 wherein the reflector comprises a Faraday rotator mirror.

3. The optical amplifier defined in claim 1 wherein the pump coupler comprises a wavelength division nultiplexing coupler.

4. The optical amplifier defined in claim 1 wherein the pump coupler comprises a circulator.

5. The optical amplifier defined in claim 1 wherein the pump coupler comprises a wavelength division multiplexing coupler and wherein the reflector comprises a Faraday rotator mirror.

6. The optical amplifier defined in claim 1 wherein the pump coupler comprises a circulator and wherein the reflector comprises a Faraday rotator mirror.

\* \* \* \* \*